United States Patent
Campo Giralte et al.

(10) Patent No.: US 10,262,034 B2
(45) Date of Patent: *Apr. 16, 2019

(54) MANAGING DATA OBSOLESCENCE IN RELATIONAL DATABASES

(71) Applicant: International Business Machines Corporation, Armonk, NY (US)

(72) Inventors: Luis Campo Giralte, Dublin (IE); Jose Luis Mujeriego Gomez, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 279 days.

This patent is subject to a terminal disclaimer.

(21) Appl. No.: 15/177,419

(22) Filed: Jun. 9, 2016

(65) Prior Publication Data
US 2017/0357691 A1   Dec. 14, 2017

(51) Int. Cl.
*G06F 17/30* (2006.01)

(52) U.S. Cl.
CPC .. *G06F 17/30463* (2013.01); *G06F 17/30303* (2013.01)

(58) Field of Classification Search
CPC ......... G06F 17/30463; G06F 17/30595; G06F 17/30303
See application file for complete search history.

(56) References Cited

U.S. PATENT DOCUMENTS

| 5,560,007 | A | 9/1996 | Thai |
| 6,901,578 | B1 | 5/2005 | Beaven et al. |
| 7,401,069 | B2 | 7/2008 | Day et al. |
| 8,856,071 | B2 | 10/2014 | Golab et al. |
| 2004/0230552 | A1 | 11/2004 | Smith et al. |
| 2008/0133454 | A1* | 6/2008 | Markl ............... G06F 17/30457 |

(Continued)

FOREIGN PATENT DOCUMENTS

| CN | 101556589 A | 10/2009 |
| EP | 0224681 A2 | 6/1987 |
| EP | 0226734 A2 | 7/1987 |

OTHER PUBLICATIONS

Gal et al., "Managing Periodically Updated Data in Relational Databases: A Stochastic Modeling Approach", Journal of the ACM, vol. 48, No. 6, Nov. 2001, pp. 1141-1183, © 2001 ACM 0004-5411/01/1100-1141, 43 pages.

(Continued)

*Primary Examiner* — Huawen A Peng
(74) *Attorney, Agent, or Firm* — Edward J. Wixted, III

(57) ABSTRACT

Data obsolescence is managed using a bitmap or bit array index which is associated with a table during an obsolescence control period. A table is selected to undergo obsolescence control for a period of time. Any records that have not been accessed for a certain number of cycles 'M', which represents an obsolescence limit, are deemed to be obsolete. During at least a part of each cycle, the results of database queries to the table are monitored, such that for each cycle an 'obsolescence' bitmap is created indicating which records were accessed. Once a sufficient number of cycles have elapsed, so that records that have not been accessed at all since the start of the obsolescence control period lie outside the obsolescence limit, queries are restricted to records which have been accessed during the last 'M' cycles by applying the 'M' most recently stored obsolescence bitmaps.

12 Claims, 9 Drawing Sheets

(56) References Cited

U.S. PATENT DOCUMENTS

2011/0040727 A1* 2/2011 Golab .............. G06F 17/30445
                                                                   707/618
2017/0060738 A1* 3/2017 Shaharabany ...... G06F 12/0253

OTHER PUBLICATIONS

"Removing Obsolete Data", SQL Server 2000, © 2016 Microsoft, 1 page, <https://technet.microsoft.com/en-us/library/aa238411(v=sql.80).aspx>.

Campo Giralte et al., "Managing Data Obsolescence in Relational Databases", U.S. Appl. No. 15/828,781, filed Dec. 1, 2017, 33 pages.

IBM Appendix P, list of patents and patent applications treated as related, filed herewith, 2 pages.

* cited by examiner

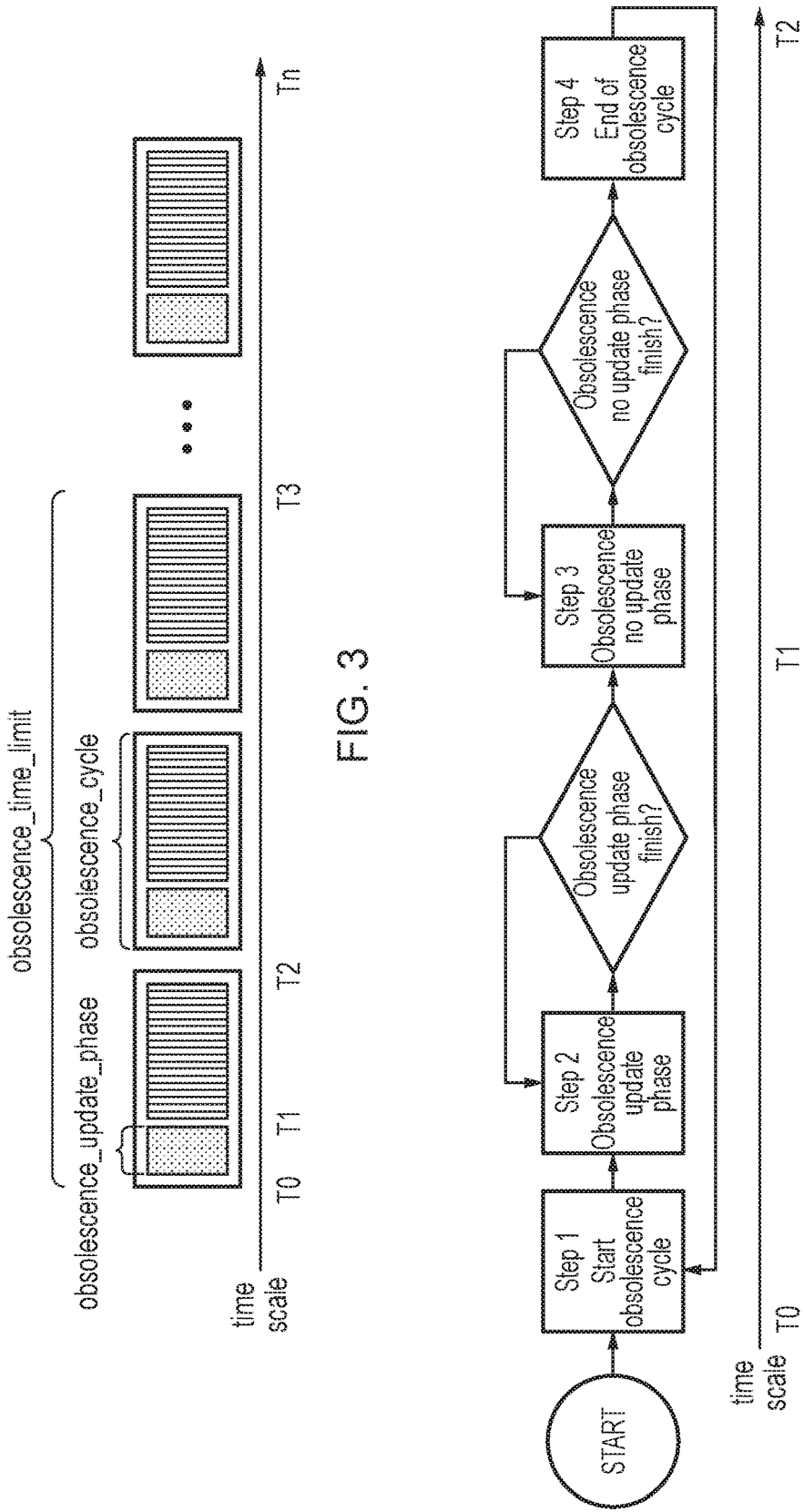

| ALTER TABLE TABLEA ENABLE OBSOLESCENCE; | | | | | | | | | | |
|---|---|---|---|---|---|---|---|---|---|---|
| T0 | | | obsolescence_mask | | 0 | 0 | 0 | 0 | 1 | 1 |
| | | | current_obsolescence_cycle | | 0 | 0 | 0 | 0 | 0 | 1 |
| TABLEA | | | | BITMAP | 0 | 0 | 0 | 0 | 1 | 1 |
| ROWID | ID | NAME | AGE | ROWID | 5 | 4 | 3 | 2 | 1 | 0 |
| 1 | 101 | AAA | 10 | 1 | 0 | 0 | 0 | 0 | 0 | 1 |
| 2 | 102 | BBB | 25 | 2 | 0 | 0 | 0 | 0 | 0 | 1 |
| 3 | 103 | CCC | 43 | 3 | 0 | 0 | 0 | 0 | 0 | 1 |
| 4 | 104 | DDD | 12 | 4 | 0 | 0 | 0 | 0 | 0 | 1 |
| 5 | 105 | EEE | 50 | 5 | 0 | 0 | 0 | 0 | 0 | 1 |
| 6 | 106 | FFF | 60 | 6 | 0 | 0 | 0 | 0 | 0 | 1 |
| 7 | 107 | GGG | 27 | 7 | 0 | 0 | 0 | 0 | 0 | 1 |
| 8 | 108 | H10 | 11 | 8 | 0 | 0 | 0 | 0 | 0 | 1 |
| 9 | 109 | H20 | 6 | 9 | 0 | 0 | 0 | 0 | 0 | 1 |
| 10 | 110 | H30 | 34 | 10 | 0 | 0 | 0 | 0 | 0 | 1 |

FIG. 5A

| SELECT * FROM TABLEA WHERE AGE>=15; | | | | | | | | | | |
|---|---|---|---|---|---|---|---|---|---|---|
| T0+1 min | | | obsolescence_mask | | 0 | 0 | 0 | 0 | 1 | 1 |
| | | SHIFT | current_obsolescence_cycle | | 0 | 0 | 0 | 0 | 1 | 0 |
| TABLEA | | | | BITMAP | 0 | 0 | 0 | 0 | 1 | 1 |
| ROWID | ID | NAME | AGE | ROWID | 5 | 4 | 3 | 2 | 1 | 0 |
| 1 | 101 | AAA | 10 | 1 | 0 | 0 | 0 | 0 | 0 | 1 |
| 2 | 102 | BBB | 25 | 2 | 0 | 0 | 0 | 0 | 1 | 0 |
| 3 | 103 | CCC | 43 | 3 | 0 | 0 | 0 | 0 | 1 | 0 |
| 4 | 104 | DDD | 12 | 4 | 0 | 0 | 0 | 0 | 0 | 1 |
| 5 | 105 | EEE | 50 | 5 | 0 | 0 | 0 | 0 | 1 | 0 |
| 6 | 106 | FFF | 60 | 6 | 0 | 0 | 0 | 0 | 1 | 0 |
| 7 | 107 | GGG | 27 | 7 | 0 | 0 | 0 | 0 | 1 | 0 |
| 8 | 108 | H10 | 11 | 8 | 0 | 0 | 0 | 0 | 0 | 1 |
| 9 | 109 | H20 | 6 | 9 | 0 | 0 | 0 | 0 | 0 | 1 |
| 10 | 110 | H30 | 34 | 10 | 0 | 0 | 0 | 0 | 1 | 0 |

FIG. 5B

| SELECT * FROM TABLEA WHERE ID=101; | | | | | | | | | | | |
|---|---|---|---|---|---|---|---|---|---|---|---|
| T0+3 min | | | obsolescence_mask | | | 0 | 0 | 0 | 0 | 1 | 1 |
| | | | current_obsolescence_cycle | | | 0 | 0 | 0 | 0 | 1 | 0 |
| TABLEA | | | | BITMAP | | 0 | 0 | 0 | 0 | 1 | 1 |
| ROWID | ID | NAME | AGE | ROWID | | 5 | 4 | 3 | 2 | 1 | 0 |
| 1 | 101 | AAA | 10 | 1 | | 0 | 0 | 0 | 0 | 1 | 0 |
| 2 | 102 | BBB | 25 | 2 | | 0 | 0 | 0 | 0 | 1 | 0 |
| 3 | 103 | CCC | 43 | 3 | | 0 | 0 | 0 | 0 | 1 | 0 |
| 4 | 104 | DDD | 12 | 4 | | 0 | 0 | 0 | 0 | 0 | 1 |
| 5 | 105 | EEE | 50 | 5 | | 0 | 0 | 0 | 0 | 1 | 0 |
| 6 | 106 | FFF | 60 | 6 | | 0 | 0 | 0 | 0 | 1 | 0 |
| 7 | 107 | GGG | 27 | 7 | | 0 | 0 | 0 | 0 | 1 | 0 |
| 8 | 108 | H10 | 11 | 8 | | 0 | 0 | 0 | 0 | 0 | 1 |
| 9 | 109 | H20 | 6 | 9 | | 0 | 0 | 0 | 0 | 0 | 1 |
| 10 | 110 | H30 | 34 | 10 | | 0 | 0 | 0 | 0 | 1 | 0 |

FIG. 5C

| SELECT * FROM TABLEA WHERE NAME LIKE 'H%'; | | | | | | | | | | | |
|---|---|---|---|---|---|---|---|---|---|---|---|
| T0+13 min | | | obsolescence_mask | | | 0 | 0 | 0 | 0 | 1 | 1 |
| | | | current_obsolescence_cycle | | | 0 | 0 | 0 | 0 | 1 | 0 |
| TABLEA | | | | BITMAP | | 0 | 0 | 0 | 0 | 1 | 1 |
| ROWID | ID | NAME | AGE | ROWID | | 5 | 4 | 3 | 2 | 1 | 0 |
| 1 | 101 | AAA | 10 | 1 | | 0 | 0 | 0 | 0 | 1 | 0 |
| 2 | 102 | BBB | 25 | 2 | | 0 | 0 | 0 | 0 | 1 | 0 |
| 3 | 103 | CCC | 43 | 3 | | 0 | 0 | 0 | 0 | 1 | 0 |
| 4 | 104 | DDD | 12 | 4 | | 0 | 0 | 0 | 0 | 0 | 1 |
| 5 | 105 | EEE | 50 | 5 | | 0 | 0 | 0 | 0 | 1 | 0 |
| 6 | 106 | FFF | 60 | 6 | | 0 | 0 | 0 | 0 | 1 | 0 |
| 7 | 107 | GGG | 27 | 7 | | 0 | 0 | 0 | 0 | 1 | 0 |
| 8 | 108 | H10 | 11 | 8 | | 0 | 0 | 0 | 0 | 1 | 0 |
| 9 | 109 | H20 | 6 | 9 | | 0 | 0 | 0 | 0 | 1 | 0 |
| 10 | 110 | H30 | 34 | 10 | | 0 | 0 | 0 | 0 | 1 | 0 |

FIG. 5D

| SELECT * FROM TABLEA; | | | | | | | | | | | |
|---|---|---|---|---|---|---|---|---|---|---|---|
| T0+16 min | | | obsolescence_mask | | | 0 | 0 | 0 | 0 | 1 | 1 |
| | | | current_obsolescence_cycle | | | 0 | 0 | 0 | 0 | 1 | 0 |
| TABLEA | | | | BITMAP | | 0 | 0 | 0 | 0 | 1 | 1 |
| ROWID | ID | NAME | AGE | | ROWID | 5 | 4 | 3 | 2 | 1 | 0 |
| 1 | 101 | AAA | 10 | | 1 | 0 | 0 | 0 | 0 | 1 | 0 |
| 2 | 102 | BBB | 25 | | 2 | 0 | 0 | 0 | 0 | 1 | 0 |
| 3 | 103 | CCC | 43 | | 3 | 0 | 0 | 0 | 0 | 1 | 0 |
| 4 | 104 | DDD | 12 | | 4 | 0 | 0 | 0 | 0 | 0 | 1 |
| 5 | 105 | EEE | 50 | | 5 | 0 | 0 | 0 | 0 | 1 | 0 |
| 6 | 106 | FFF | 60 | | 6 | 0 | 0 | 0 | 0 | 1 | 0 |
| 7 | 107 | GGG | 27 | | 7 | 0 | 0 | 0 | 0 | 1 | 0 |
| 8 | 108 | H10 | 11 | | 8 | 0 | 0 | 0 | 0 | 1 | 0 |
| 9 | 109 | H20 | 6 | | 9 | 0 | 0 | 0 | 0 | 1 | 0 |
| 10 | 110 | H30 | 34 | | 10 | 0 | 0 | 0 | 0 | 1 | 0 |

FIG. 5E

| SELECT * FROM TABLEA WHERE AGE>=50; | | | | | | | | | | | |
|---|---|---|---|---|---|---|---|---|---|---|---|
| T1=T0+60 min | | | obsolescence_mask | | | 0 | 0 | 0 | 0 | 1 | 1 |
| | | SHIFT | current_obsolescence_cycle | | | 0 | 0 | 0 | 1 | 0 | 0 |
| TABLEA | | | | BITMAP | | 0 | 0 | 0 | 1 | 1 | 1 |
| ROWID | ID | NAME | AGE | | ROWID | 5 | 4 | 3 | 2 | 1 | 0 |
| 1 | 101 | AAA | 10 | | 1 | 0 | 0 | 0 | 0 | 1 | 0 |
| 2 | 102 | BBB | 25 | | 2 | 0 | 0 | 0 | 0 | 1 | 0 |
| 3 | 103 | CCC | 43 | | 3 | 0 | 0 | 0 | 0 | 1 | 0 |
| 4 | 104 | DDD | 12 | | 4 | 0 | 0 | 0 | 0 | 0 | 1 |
| 5 | 105 | EEE | 50 | | 5 | 0 | 0 | 0 | 1 | 0 | 0 |
| 6 | 106 | FFF | 60 | | 6 | 0 | 0 | 0 | 1 | 0 | 0 |
| 7 | 107 | GGG | 27 | | 7 | 0 | 0 | 0 | 0 | 1 | 0 |
| 8 | 108 | H10 | 11 | | 8 | 0 | 0 | 0 | 0 | 1 | 0 |
| 9 | 109 | H20 | 6 | | 9 | 0 | 0 | 0 | 0 | 1 | 0 |
| 10 | 110 | H30 | 34 | | 10 | 0 | 0 | 0 | 0 | 1 | 0 |

FIG. 5F

| SELECT * FROM TABLEA WHERE NAME LIKE 'H%'; | | | | | | | | | | |
|---|---|---|---|---|---|---|---|---|---|---|
| T1+7 min | | | obsolescence_mask | | 0 | 0 | 0 | 0 | 1 | 1 |
| | | | current_obsolescence_cycle | | 0 | 0 | 0 | 1 | 0 | 0 |
| TABLEA | | | | BITMAP | 0 | 0 | 0 | 1 | 1 | 1 |
| ROWID | ID | NAME | AGE | ROWID | 5 | 4 | 3 | 2 | 1 | 0 |
| 1 | 101 | AAA | 10 | 1 | 0 | 0 | 0 | 0 | 1 | 0 |
| 2 | 102 | BBB | 25 | 2 | 0 | 0 | 0 | 0 | 1 | 0 |
| 3 | 103 | CCC | 43 | 3 | 0 | 0 | 0 | 0 | 1 | 0 |
| 4 | 104 | DDD | 12 | 4 | 0 | 0 | 0 | 0 | 0 | 1 |
| 5 | 105 | EEE | 50 | 5 | 0 | 0 | 0 | 1 | 0 | 0 |
| 6 | 106 | FFF | 60 | 6 | 0 | 0 | 0 | 1 | 0 | 0 |
| 7 | 107 | GGG | 27 | 7 | 0 | 0 | 0 | 0 | 1 | 0 |
| 8 | 108 | H10 | 11 | 8 | 0 | 0 | 0 | 1 | 0 | 0 |
| 9 | 109 | H20 | 6 | 9 | 0 | 0 | 0 | 1 | 0 | 0 |
| 10 | 110 | H30 | 34 | 10 | 0 | 0 | 0 | 1 | 0 | 0 |

FIG. 5G

| SELECT * FROM TABLEA WHERE ID=1; | | | | | | | | | | |
|---|---|---|---|---|---|---|---|---|---|---|
| T1+12 min | | | obsolescence_mask | | 0 | 0 | 0 | 0 | 1 | 1 |
| | | | current_obsolescence_cycle | | 0 | 0 | 0 | 1 | 0 | 0 |
| TABLEA | | | | BITMAP | 0 | 0 | 0 | 1 | 1 | 1 |
| ROWID | ID | NAME | AGE | ROWID | 5 | 4 | 3 | 2 | 1 | 0 |
| 1 | 101 | AAA | 10 | 1 | 0 | 0 | 0 | 1 | 0 | 0 |
| 2 | 102 | BBB | 25 | 2 | 0 | 0 | 0 | 0 | 1 | 0 |
| 3 | 103 | CCC | 43 | 3 | 0 | 0 | 0 | 0 | 1 | 0 |
| 4 | 104 | DDD | 12 | 4 | 0 | 0 | 0 | 0 | 0 | 1 |
| 5 | 105 | EEE | 50 | 5 | 0 | 0 | 0 | 1 | 0 | 0 |
| 6 | 106 | FFF | 60 | 6 | 0 | 0 | 0 | 1 | 0 | 0 |
| 7 | 107 | GGG | 27 | 7 | 0 | 0 | 0 | 0 | 1 | 0 |
| 8 | 108 | H10 | 11 | 8 | 0 | 0 | 0 | 1 | 0 | 0 |
| 9 | 109 | H20 | 6 | 9 | 0 | 0 | 0 | 1 | 0 | 0 |
| 10 | 110 | H30 | 34 | 10 | 0 | 0 | 0 | 1 | 0 | 0 |

FIG. 5H

| SELECT * FROM TABLEA WHERE AGE>=12; | | | | | | | | | | | |
|---|---|---|---|---|---|---|---|---|---|---|---|
| T1+20 min | | | obsolescence_mask | | 0 | 0 | 0 | 1 | 1 | 0 | |
| | | | current_obsolescence_cycle | | 0 | 0 | 0 | 1 | 0 | 0 | |
| TABLEA | | | | BITMAP | 0 | 0 | 0 | 1 | 1 | 0 | |
| ROWID | ID | NAME | AGE | ROWID | 5 | 4 | 3 | 2 | 1 | 0 | |
| 1 | 101 | AAA | 10 | 1 | 0 | 0 | 0 | 1 | 0 | 0 | |
| 2 | 102 | BBB | 25 | 2 | 0 | 0 | 0 | 0 | 1 | 0 | |
| 3 | 103 | CCC | 43 | 3 | 0 | 0 | 0 | 0 | 1 | 0 | |
| 4 | 104 | DDD | 12 | 4 | 0 | 0 | 0 | 0 | 0 | 1 | |
| 5 | 105 | EEE | 50 | 5 | 0 | 0 | 0 | 1 | 0 | 0 | |
| 6 | 106 | FFF | 60 | 6 | 0 | 0 | 0 | 1 | 0 | 0 | |
| 7 | 107 | GGG | 27 | 7 | 0 | 0 | 0 | 0 | 1 | 0 | |
| 8 | 108 | H10 | 11 | 8 | 0 | 0 | 0 | 1 | 0 | 0 | |
| 9 | 109 | H20 | 6 | 9 | 0 | 0 | 0 | 1 | 0 | 0 | |
| 10 | 110 | H30 | 34 | 10 | 0 | 0 | 0 | 1 | 0 | 0 | |

FIG. 5I

| SELECT * FROM TABLEA; | | | | | | | | | | | |
|---|---|---|---|---|---|---|---|---|---|---|---|
| T1+21 min | | | obsolescence_mask | | 0 | 0 | 0 | 1 | 1 | 0 | |
| | | | current_obsolescence_cycle | | 0 | 0 | 0 | 1 | 0 | 0 | |
| TABLEA | | | | BITMAP | 0 | 0 | 0 | 1 | 1 | 0 | |
| ROWID | ID | NAME | AGE | ROWID | 5 | 4 | 3 | 2 | 1 | 0 | |
| 1 | 101 | AAA | 10 | 1 | 0 | 0 | 0 | 1 | 0 | 0 | |
| 2 | 102 | BBB | 25 | 2 | 0 | 0 | 0 | 0 | 1 | 0 | |
| 3 | 103 | CCC | 43 | 3 | 0 | 0 | 0 | 0 | 1 | 0 | |
| 4 | 104 | DDD | 12 | 4 | 0 | 0 | 0 | 0 | 0 | 1 | |
| 5 | 105 | EEE | 50 | 5 | 0 | 0 | 0 | 1 | 0 | 0 | |
| 6 | 106 | FFF | 60 | 6 | 0 | 0 | 0 | 1 | 0 | 0 | |
| 7 | 107 | GGG | 27 | 7 | 0 | 0 | 0 | 0 | 1 | 0 | |
| 8 | 108 | H10 | 11 | 8 | 0 | 0 | 0 | 1 | 0 | 0 | |
| 9 | 109 | H20 | 6 | 9 | 0 | 0 | 0 | 1 | 0 | 0 | |
| 10 | 110 | H30 | 34 | 10 | 0 | 0 | 0 | 1 | 0 | 0 | |

FIG. 5J

| SELECT * FROM TABLEA WHERE AGE>=50 OR AGE<=12; | | | | | | | | | | | |
|---|---|---|---|---|---|---|---|---|---|---|---|
| T2=T0+120 min | | | obsolescence_mask | | 0 | 0 | 0 | 1 | 1 | 0 |
| | | SHIFT | current_obsolescence_cycle | | 0 | 0 | 1 | 0 | 0 | 0 |
| TABLEA | | | | BITMAP | 0 | 0 | 1 | 1 | 1 | 0 |
| ROWID | ID | NAME | AGE | ROWID | 5 | 4 | 3 | 2 | 1 | 0 |
| 1 | 101 | AAA | 10 | 1 | 0 | 0 | 1 | 0 | 0 | 0 |
| 2 | 102 | BBB | 25 | 2 | 0 | 0 | 0 | 0 | 1 | 0 |
| 3 | 103 | CCC | 43 | 3 | 0 | 0 | 0 | 0 | 1 | 0 |
| 4 | 104 | DDD | 12 | 4 | 0 | 0 | 0 | 0 | 0 | 1 |
| 5 | 105 | EEE | 50 | 5 | 0 | 0 | 1 | 0 | 0 | 0 |
| 6 | 106 | FFF | 60 | 6 | 0 | 0 | 1 | 0 | 0 | 0 |
| 7 | 107 | GGG | 27 | 7 | 0 | 0 | 0 | 0 | 1 | 0 |
| 8 | 108 | H10 | 11 | 8 | 0 | 0 | 1 | 0 | 0 | 0 |
| 9 | 109 | H20 | 6 | 9 | 0 | 0 | 1 | 0 | 0 | 0 |
| 10 | 110 | H30 | 34 | 10 | 0 | 0 | 0 | 1 | 0 | 0 |

FIG. 5K

| SELECT * FROM TABLEA WHERE AGE>=50 OR AGE<=12; | | | | | | | | | | | |
|---|---|---|---|---|---|---|---|---|---|---|---|
| T2+2min | | | obsolescence_mask | | 0 | 0 | 0 | 1 | 1 | 0 |
| | | | current_obsolescence_cycle | | 0 | 0 | 1 | 0 | 0 | 0 |
| TABLEA | | | | BITMAP | 0 | 0 | 1 | 1 | 1 | 0 |
| ROWID | ID | NAME | AGE | ROWID | 5 | 4 | 3 | 2 | 1 | 0 |
| 1 | 101 | AAA | 10 | 1 | 0 | 0 | 1 | 0 | 0 | 0 |
| 2 | 102 | BBB | 25 | 2 | 0 | 0 | 0 | 0 | 1 | 0 |
| 3 | 103 | CCC | 43 | 3 | 0 | 0 | 0 | 0 | 1 | 0 |
| 4 | 104 | DDD | 12 | 4 | 0 | 0 | 0 | 0 | 0 | 1 |
| 5 | 105 | EEE | 50 | 5 | 0 | 0 | 1 | 0 | 0 | 0 |
| 6 | 106 | FFF | 60 | 6 | 0 | 0 | 1 | 0 | 0 | 0 |
| 7 | 107 | GGG | 27 | 7 | 0 | 0 | 0 | 0 | 1 | 0 |
| 8 | 108 | H10 | 11 | 8 | 0 | 0 | 1 | 0 | 0 | 0 |
| 9 | 109 | H20 | 6 | 9 | 0 | 0 | 1 | 0 | 0 | 0 |
| 10 | 110 | H30 | 34 | 10 | 0 | 0 | 0 | 1 | 0 | 0 |

FIG. 5L

| SELECT * FROM TABLEA; | | | | | | | | | | | |
|---|---|---|---|---|---|---|---|---|---|---|---|
| T2+16 min | | | obsolescence_mask | | | 0 | 0 | 1 | 1 | 0 | 0 |
| | | | current_obsolescence_cycle | | | 0 | 0 | 1 | 0 | 0 | 0 |
| TABLEA | | | | BITMAP | | 0 | 0 | 1 | 1 | 0 | 0 |
| ROWID | ID | NAME | AGE | | ROWID | 5 | 4 | 3 | 2 | 1 | 0 |
| 1 | 101 | AAA | 10 | | 1 | 0 | 0 | 1 | 0 | 0 | 0 |
| 2 | 102 | BBB | 25 | | 2 | 0 | 0 | 0 | 0 | 1 | 0 |
| 3 | 103 | CCC | 43 | | 3 | 0 | 0 | 0 | 0 | 1 | 0 |
| 4 | 104 | DDD | 12 | | 4 | 0 | 0 | 0 | 0 | 0 | 1 |
| 5 | 105 | EEE | 50 | | 5 | 0 | 0 | 1 | 0 | 0 | 0 |
| 6 | 106 | FFF | 60 | | 6 | 0 | 0 | 1 | 0 | 0 | 0 |
| 7 | 107 | GGG | 27 | | 7 | 0 | 0 | 0 | 0 | 1 | 0 |
| 8 | 108 | H10 | 11 | | 8 | 0 | 0 | 1 | 0 | 0 | 0 |
| 9 | 109 | H20 | 6 | | 9 | 0 | 0 | 1 | 0 | 0 | 0 |
| 10 | 110 | H30 | 34 | | 10 | 0 | 0 | 0 | 1 | 0 | 0 |

FIG. 5M

MANAGING DATA OBSOLESCENCE IN RELATIONAL DATABASES

BACKGROUND

The present disclosure relates to managing data obsolescence in relational databases.

Databases are used to store information for many applications, including various commercial, industrial, technical, scientific and educational applications. The volume of data being stored and processed in databases continues to increase seemingly inexorably. However, the ability of database systems to store data and to process queries is inevitably limited. Relational databases organize data into formally-defined tables of tuples or records. The tables are typically accessed using a computer language such as Structured Query Language (SQL) in which the tables consist of rows for the records and columns for the data values.

A database management system (DBMS) is the entity responsible for processing database queries to access the relevant data stored in a database. How best to process database queries, e.g. in terms of speed and consumption of internal processing resource, is referred to as query optimization.

One significant performance bottleneck when processing database queries is the input/output (I/O) activity associated with retrieving data from memory. An efficient way of reducing query I/O in a relational database is to use bitmap (or bit array) indexing. A bitmap consists of a vector of 1-bit elements in which each element corresponds to a row of a table. Bitmaps are particularly useful in searching table columns over which an index has been built for a particular selection criterion or criteria. To execute a query, the DBMS scans the index and creates a bitmap by setting each bitmap element to either a '1' or a '0' depending on whether the value in the corresponding row of that column satisfies the selection criteria. A '1' typically indicates that the selection criteria is satisfied while a '0' indicates otherwise. (The reverse is also possible.) By using a bitmap, the database engine can forego testing database records having '0' entries and, moreover, avoid retrieving these records at all. As a result, the amount of I/O needed to process a database query can be significantly reduced.

Bitmaps are useful for notification applications in which repeated, often similar or identical, queries are applied to a notification application database, which is continuously being added to with new records. If the database table becomes too large, the queries are slowed and the increasing size of the database consumes increasing amounts of memory and mass storage. Here it is known to remove obsolete data from the database based on a retention age limit in a process referred to as vacuuming.

One factor that links query performance to underlying hardware is that data storage in a computer system will be tiered, with a hierarchy between the fastest access, lowest volume memory local to the processors and the slowest access, largest volume memory and mass storage devices which have to be accessed over a system bus or network connection. Memory access speed lags are usually referred to as latency. Memory access times may be tiered following a basic split between volatile memory (e.g. RAM) with faster access times and non-volatile memory (e.g. ROM) with slower access times. There may also be significant splits within those groups, e.g. for the volatile memory on a particular motherboard there may be a split between on-processor memory, one or more types of cache memory and general memory. At any one time, different parts of a database will therefore likely be stored at different hierarchical storage levels on the host computer system with a range of latencies. Sometimes, in-demand data is referred to as 'hot' and data which is infrequently accessed 'cold', leading to the term multi-temperature storage (MTS) being used.

The perfect (and unattainable) situation would of course be that all records that will need to be searched when processing the next query are already stored in the fastest access tier of memory. The more practical aim is to make sure that records which, based on past activity, are unlikely to be the subject of queries in the near future are relegated to slow access memory tiers, whereas those which are predicted to be the subject of queries in the near future are resident in fast access memory tiers. For many types of application, it is unacceptable or undesirable to permanently delete obsolete records with a vacuuming process; rather all records should be retained, but with the obsolete ones preferably being moved to archive, e.g. high latency memory or mass storage.

In the following, we refer to data relating to records which are deemed to be unlikely to be the subject of queries in the near future as obsolescent data. What is described in the following is a method of managing the obsolescence of data in a database.

SUMMARY OF THE INVENTION

A method of operating a database management system responsible for processing queries of a relational database which stores data in tables of records includes: selecting a table to undergo obsolescence control for a period of time, wherein the selection involves specifying: a total number of cycles for which obsolescence control will take place, which is at least three; a duration of each cycle; and a time limit 'M' specified in terms of a number of cycles, which is at least two but less than the total number of cycles; monitoring results of database queries to that table during the first cycle, wherein records that are accessed by a database query are tagged; storing an obsolescence bitmap of records accessed during the first cycle; monitoring results of database queries to that table during the next cycle, wherein records that are accessed by a database query are tagged; storing a further obsolescence bitmap of records accessed during this next cycle; and repeating the monitoring and storing steps for subsequent cycles so that an obsolescence bitmap is stored for each cycle, wherein, once 'M' obsolescence bitmaps are available, queries are restricted to records which have been accessed during the last 'M' cycles by applying the 'M' most recently stored obsolescence bitmaps. A corresponding computer system and computer program product are also disclosed herein.

BRIEF DESCRIPTION OF THE DRAWINGS

FIG. 3 shows, in accordance with an embodiment of the present invention, how obsolescence management is performed by the database management system of FIG. 2 through an obsolescence control period made up of a number of obsolescence cycles;

FIG. 4 is a flow diagram of the steps within a single obsolescence cycle in accordance with an embodiment of the present invention; and FIGS. 5A to 5M each show, in accordance with an embodiment of the present invention, the status of a data table and a bitmap index table at a succession of points in time during a multi-cycle obsolescence control period.

DETAILED DESCRIPTION

Figure 1:
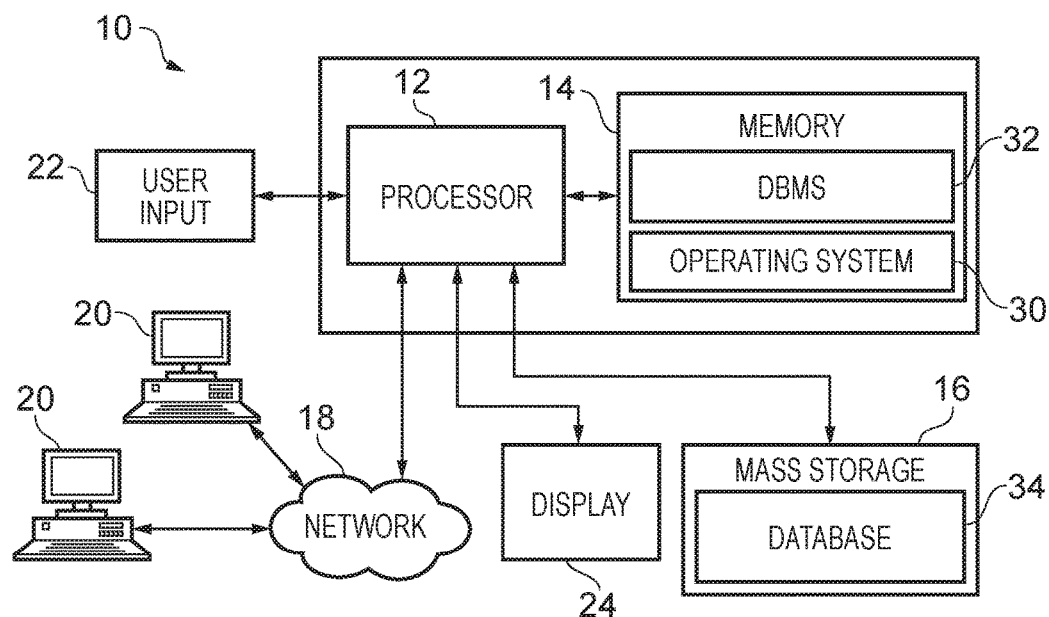
FIG. 1 is a block diagram of a networked computer system incorporating a database management system in accordance with an embodiment of the present invention.

The advocated approach can provide improved performance, since the number of records to be retrieved from storage will be fewer, as dictated by the obsolescence bitmap index structure and the current cycle of obsolescence control for the table, which limits each search query to non-obsolete records. Obsolete records can be moved to a different table during an obsolescence control period.

The advocated approach can also provide for better usage of overall storage in a hierarchical storage structure, based on size and variations in latency. Obsolete records can be moved to a slower storage while non obsolete can remain in higher performance storage. The proposed approach is therefore inherently compatible with multi-temperature storage management solutions.

The step of selecting a table to undergo obsolescence control may further involve specifying an update phase during each cycle, which will generally be shorter than the cycle duration, and wherein the monitoring of the results of database queries during the first cycle and subsequent cycles is restricted to the update phase of each cycle, so that the obsolescence bitmap of each cycle relates only to records accessed during the update phase of that cycle.

At the end of the obsolescence control period, the obsolescence control for the table can be de-selected allowing subsequent queries to access all records of the table. Alternatively, at the end of the obsolescence control period, the obsolescence control for the table is continued with by rotating the 'M' most recently stored obsolescence bitmaps to where they would have been had they been generated in the first 'M' cycles, so that subsequent queries continue to be restricted to records which have been accessed during the last 'M' cycles.

During the obsolescence control period, records which can no longer be accessed by queries can be moved to higher latency storage.

During the obsolescence control period, records which can no longer be accessed by queries and are hence obsolete can be moved into a different table, to create an obsolete table distinct from the selected table which will now only contain records which are still accessible as identified by the most recently stored 'M' obsolescence bitmaps, and, on conclusion of the obsolescence control period, the obsolete table is merged back into the selected table.

When storing an obsolescence bitmap for a current cycle 'n', the bitmaps of the 'n−1'th to 'n−M'th cycles can be refreshed to untag records that were accessed in those previous cycles but have also been accessed in the current cycle, so that bitmaps of the 'n−1'th to 'n−M'th cycles only tag records that have not been accessed in the current cycle, but were accessed in that previous cycle.

The obsolescence bitmaps can be dis-associated from the tables with which they are associated in such a way that modifications to contents of a table during a period when obsolescence control is being applied do not cause modification of its obsolescence bitmaps.

In the following detailed description, for purposes of explanation and not limitation, specific details are set forth in order to provide a better understanding of the present disclosure. It will be apparent to one skilled in the art that the present disclosure may be practiced in other embodiments that depart from these specific details. In the drawings, like reference numeral are used to denote like parts. FIG. 1 illustrates an example generic hardware and software environment for an apparatus 10 suitable for implementing a database management system incorporating bitmap indexing for servicing database queries.

In the following detailed description, we refer to tables being made up of rows and columns, as is the case for SQL relational databases. It will however be known to the person skilled in the art that the primary element of a generic relational database is a tuple or record (not a row). References to rows should therefore be read as encompassing tuples and records.

The apparatus 10 may represent practically any type of computer, computer system or other programmable electronic device, including a client computer, a server computer, a portable computer, a handheld computer, a tablet, a smart phone, an embedded controller, etc. Moreover, apparatus 10 may be implemented using one or more networked computers, e.g., in a cluster or other distributed computing system. Apparatus 10 will hereinafter also be referred to as a "computer", although it should be appreciated the term "apparatus" may also include other suitable electronic devices having suitable processing power and storage capabilities.

Computer 10 typically includes at least one processor 12 coupled to a memory 14. Processor 12 may represent one or more processors (e.g., microprocessors), and memory 14 may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor 12, as well as any storage capacity used as a virtual memory, e.g., as stored on a mass storage device 16 or on another computer coupled to computer 10 via network 18 (e.g., a client computer 20).

Computer 10 also typically receives a number of inputs and outputs for communicating information externally. For interface with a user or operator, computer 10 typically includes one or more user input devices 22 (e.g., a keyboard, a mouse, a trackball, a joystick, a touchpad, and/or a microphone coupled with automated speech recognition software, among others) and a display 24. Otherwise, user input may be received via another computer (e.g., a computer 20) interfaced with computer 10 over network 18, or via a dedicated workstation interface or the like.

For additional storage, computer 10 may also include one or more mass storage devices 16, e.g., a solid-state drive, a disk drive, a direct access storage device (DASD), an optical drive (e.g., a CD drive, a DVD drive, etc.), and/or a tape drive, among others. Furthermore, computer 10 may include an interface with one or more networks 18 (e.g., a LAN, a WLAN, a wireless network, and/or the Internet, among others) to permit the communication of information with other computers coupled to the network. It should be appreciated that computer 10 typically includes suitable analog and/or digital interfaces between processor 12 and each of components 14, 16, 18, 22 and 24 as is well known in the art.

Computer 10 operates under the control of an operating system 30, and executes or otherwise relies upon various computer software applications, components, programs, objects, modules, data structures, etc. (e.g., database management system 32 and database 34, among others). Moreover, various applications, components, programs, objects, modules, etc. may also execute on one or more processors in another computer coupled to computer 10 via a network 18, e.g., in a distributed or client-server computing environment, whereby the processing required to implement the functions of a computer program may be allocated to multiple computers over a network.

Figure 2:
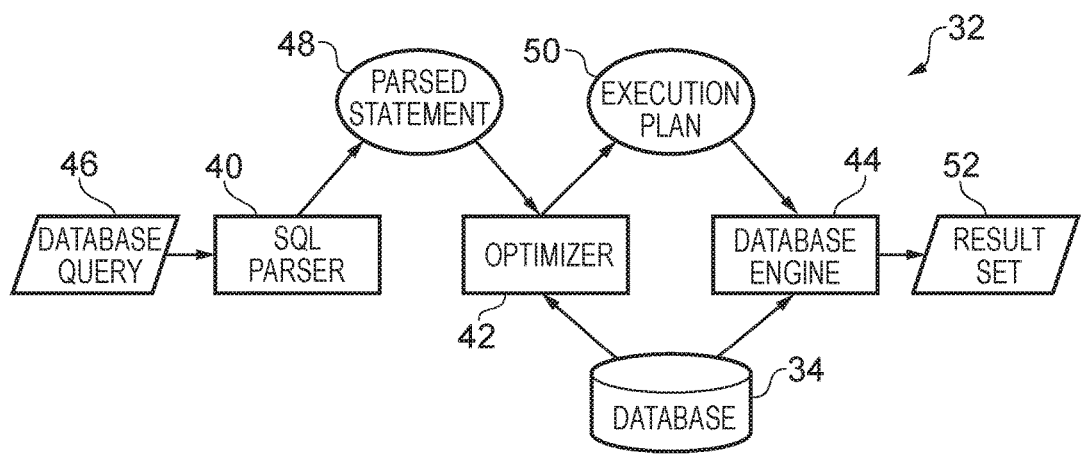
FIG. 2 is a block diagram illustrating the database management system of FIG. 1 in accordance with an embodiment of the present invention.

FIG. 2 shows an exemplary implementation of the database management system 32 of FIG. 1. The principal components of database management system 32 that are relevant to query optimization are SQL parser 40, optimizer 42 and database engine 44. SQL parser 40 receives from a user a database query 46, which in the illustrated embodiment, is provided in the form of an SQL statement. SQL parser 40 then generates a parsed statement 48 therefrom, which is passed to optimizer 42 for query optimization. As a result of query optimization, an execution or access plan 50 is generated, often using data such as platform capabilities, query content information, etc., that is stored in database 34. Once generated, the execution plan is forwarded to database engine 44 for execution of the database query on the information in database 34. The result of the execution of the database query is typically stored in a result set, as represented at block 52.

Other components may be incorporated into system 32, as may other suitable database management architectures. Other database programming and organizational architectures may also be used.

The obsolescence management approach disclosed herein may be implemented in a database management system, a database management method and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowcharts, block diagrams and tables of methods, systems (i.e. apparatuses), and computer program products according to embodiments of the disclosure. It will be understood that each block of the flowcharts, block diagrams and tables, and combinations of blocks thereof can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks and/or tables. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks and/or tables.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks and/or tables.

A method of operating a DBMS 32 is now described by which obsolescence of data in the database 34 is managed. The database 34 is a relational database which stores data in tables consisting of rows and columns.

FIG. 3 generally shows the time framework used by the obsolescence control method. Obsolescence control can be activated, i.e. selected, for any table in the database, as desired. The activation of obsolescence control for a particular table requires several parameters to be set. The obsolescence control is set to take place for a specific period of time, which is broken up into cycles and defined in terms of a number of cycles. For example, if monitoring is desired for 24 hours, then the control period can be defined as lasting for 24 cycles of one-hour duration. Another parameter to set is a time limit for obsolescence filtering, which is also defined in terms of an integer number of cycles. This time limit forms a time window from the current time, back in time by an amount equal to the time limit. For example, with 24 cycles, the time limit could be set to 2, 3 or 4 cycles. A further parameter to set is an update phase in each cycle, which will generally be a limited period at the beginning of each cycle shorter than the overall cycle duration, but may be set to be equal to the cycle duration. For example, with one hour cycles, the update phase may be 10, 15, 20 or 30 minutes.

Specifically, selecting a table to undergo obsolescence control involves specifying values for the following parameters. A total number of cycles 'N' for which obsolescence control will take place, which is at least three. A duration 'T' of each cycle. An update phase 'ΔT' during each cycle, which may be specified to have up to and including the cycle duration. An obsolescence time limit specified in terms of a number of cycles 'M' which is at least two but less than the total number of cycles 'N'.

The parameters for specifying obsolescence are thus as follows:

obsolescence_time_limit=<integer> which is the number of cycles 'M' past which the data will be categorized as obsolete;

obsolescence_update_phase=<integer> which is the number of seconds/minutes/hours/days during which updates to the bitmap index will occur;

obsolescence_cycle=<integer> which is the number of seconds/minutes/hours/days a whole cycle will last for; and obsolescence_control_period=<integer> which is the number of cycles 'N' over which obsolescence control will be carried out.

Example 1

Setting up daily obsolescence for 7 days on any rows retrieved by any queries in the next 4 hours from table PRODUCT_FACTS, starting now.

1.—Set parameter obsolescence_cycle to be checked daily
→SET obsolescence_cycle=1440

2.—Set parameter obsolescence_update to be 4 hours
→SET obsolescence_update_phase=240

3.—Set parameter obsolescence_limit to be 2 cycles
→SET obsolescence_time_limit=2

4.—Set parameter obsolescence_control_period to be 7 cycles
→SET obsolescence_control_period=7

Here the obsolescence parameters are stated in minutes.

ALTER TABLE PRODUCT_FACTS ENABLE OBSOLESCENCE;

And then at the end of the 7 days, disabling obsolescence for table PRODUCT_FACTS by issuing the command:

ALTER TABLE PRODUCT_FACTS DISABLE OBSOLESCENCE;

Example 2

Setting up weekly obsolescence for 6 months (i.e. 26 weeks) on any rows retrieved by any queries in the next 12 hours from the table PRODUCT_FACTS, starting now.

1.—Set parameter obsolescence_cycle to be checked weekly
→SET obsolescence_cycle=10080

2.—Set parameter obsolescence_update to be 12 hours
→SET obsolescence_update_phase=720

3.—Set parameter obsolescence_limit to be 3 weeks
→SET obsolescence_time_limit=3

4.—Set parameter obsolescence_control_period to be 26 weeks
→SET obsolescence_control_period=26

ALTER TABLE PRODUCT_FACTS ENABLE OBSOLESCENCE;

Here the obsolescence parameters are stated in minutes. And then at the end of the 6 months, disabling obsolescence for table PRODUCT_FACTS by issuing the command:

ALTER TABLE PRODUCT_FACTS DISABLE OBSOLESCENCE;

Having given these two examples, the main description now continues. In addition to the above-specified startup parameters, a bitmap cycle counter and a bit mask are required to be stored as metadata in a metadata database store or file associated with each table. The parameter names are:

current_obsolescence_cycle
obsolescence_mask

The bitmap cycle counter and the bit mask can be two new fields added to the table metadata. The purpose of the parameter 'current_obsolescence_cycle' is to count which obsolescence cycle is current for each table. This value will be updated, i.e. incremented, with a unique bit shifting to the left for each cycle and starting with the least significant bit as in this example:

cycle1→current_obsolescence_cycle=0000 . . . 00000001
cycle2→current_obsolescence_cycle=0000 . . . 00000010
. . .
cycleN→current_obsolescence_cycle=1000 . . . 00000000

The purpose of the parameter 'obsolescence_mask' is to validate obsolescence records according to the binary value of the bitmap index values. This obsolescence cycle value will be updated by shifting to the left at the end of each cycle, but only if:

current_obsolescence_cycle>obsolescence_mask

Initially the parameter 'obsolescence_mask' will be set up so that its 'M' least significant bits are set to '1', as shown in the following examples. For obsolescence_time_limit=3 the obsolescence_mask=0 . . . 00000000111. For obsolescence_time_limit=7 the obsolescence_mask=0 . . . 00001111111. Initially the bitmap index would contain all rowids of the target table with the value for obsolescence set to 1 to indicate no obsolete rows are present in the table.

FIG. 4 is a flow diagram of the steps within a single obsolescence cycle.

"START" relates to the setup process already outlined above. Namely, an existing table (or set of tables) is selected to be subjected to obsolescence control. The selected table requires receipt of an alter command to start the obsolescence control:

ALTER TABLE<table_name>ENABLE OBSOLESCENCE;

This alter table command will trigger the creation of a bitmap which need not be and is preferably not associated directly with the table. This dis-association means that the bitmap index does not require updates for every change that is made to the table under some conditions, but still will have a structure that contains the rowids (i.e. row identifiers) of the table, and also, as described further below, a bitmap relating to the obsolescence control process.

A complimentary command is also provided to terminating obsolescence control on a particular table so that obsolescence control is de-selected.

ALTER TABLE<table_name>DISABLE OBSOLESCENCE;

Step 1, following setup, starts the first obsolescence cycle. The value of 'current_obsolescence_cycle' is incremented by bit shifting to the left.

Step 2 is the update phase, which is the initial part of the first obsolescence cycle. During the first update phase, the process monitors results of database queries to the table, wherein rows that are accessed by a database query are tagged. At the end of the first update phase an obsolescence bitmap is stored which corresponds to the rows that were accessed during this first update phase of the first cycle. Updates to this bitmap index are restricted to this update phase. During the update phase, rows need to comply with the SQL filter condition and also with the bitmap operation on the corresponding value for each row and the values of 'current_obsolescence_cycle' and 'obsolescence_mask'. This operation is defined as:

(current_obsolescence_cycle OR obsolescence_mask) AND rowbitmap=rowbitmap

If the row meets the conditions (SQL filter and bitmap), the row is returned and the bitmap updated accordingly to reflect that the row was returned in the current cycle by updating the binary value of the bitmap index with the value of:

shift_left(current_obsolescence_cycle)

Step 3 is entered after the end of the update phase. During this step, which forms the latter part of each cycle, queries are processed, but they are not monitored by the obsolescence control, i.e. no updates are made to the obsolescence bitmap created in Step 2. Rather, using the bitmap created in Step 2, SQL or other database execution can resume as normal, but additionally being filtered by the obsolescence control provided by the bitmap. In Step 3, if:

current_obsolescence_cycle>obsolescence_mask then an update is made to 'obsolescence_mask' is done by shifting it to the left. This takes account of the fact that the obsolescence time limit window only gains significance once a number of cycles has elapsed corresponding to the width of the obsolescence time limit window, or more precisely until the update phase has been repeated 'M' times, where 'M' is the integer cycle width of the obsolescence time limit window. To satisfy a search query, rows then need to comply with the SQL filter condition and also with a bitmap operation on the corresponding value for each row and the value of 'current_obsolescence_cycle'. This operation is defined as:

(current_obsolescence_cycle OR obsolescence_mask) AND rowbitmap=rowbitmap

If the row meets the conditions (SQL filter and bitmap) the row is returned.

Step 4 relates to the end of the cycle, and then control is passed back to Step 1 for the next cycle for a total of 'N' cycles, i.e. until 'n=N'.

In summary, an obsolescence bitmap is generated and stored for each cycle based on the search queries that take place during the update phase. The obsolescence bitmaps of the last 'M' update phases are then applied in combination with the SQL filter condition when processing database queries relating to the table.

At the end of the obsolescence_control_period the obsolescence can be disabled by using the command:

ALTER TABLE PRODUCT_FACTS DISABLE OBSOLESCENCE

Alternatively, obsolescence values can be automatically recycled by the following actions:

1. Rotate to the left obsolescence_mask
2. Rotate to the left current_obsolecence_cycle
3. Rotate to the left rowbitmap
4. Update all rowid bitmaps with: obsolescence_mask AND rowbitmap These operations will have the effect of resetting all values in the bitmap that are "older" than the obsolescence_control_period with fresh zeroes for continued used, keeping the used values for reference of previously retrieved rows. In other words, at the end of the obsolescence control period, the obsolescence control for the table is continued with by rotating the 'M' most recently stored obsolescence bitmaps to where they would have been had they been generated in the first 'M' cycles, so that subsequent queries continue to be restricted to records which have been accessed during the last 'M' cycles. This process requires an additional condition in practice which can be part of the implementation details and is:

length (obsolescence_mask)<length (bitmap)

This process will allow for recycling of obsolete values within the bitmap. This process can be included within the flow by specifying the value of 0 for the obsolescence_control_period configuration parameter. This process can be included within the "Step 4" of the "FIG. 4". The triggering condition for this process is defined as:

current_obsolescence_cycle=2^length(obsolescence_cycle)−1

Alternatively, the obsolescence could be restarted from initial state by issuing the command:

ALTER TABLE PRODUCT_FACTS RESET OBSOLESCENCE

This command will have the effect of resetting all the values to their initial state when obsolescence on the target table was first enabled. This will have the immediate effect of considering all rows as not obsolete and therefore being candidates to be returned by any query.

The creation and use of the obsolescence bitmaps is now described in more detail with reference to a specific example. The relational database table of the example is as follows:

TABLE A

| ROWID | ID | NAME | AGE |
|---|---|---|---|
| 1 | 101 | AAA | 10 |
| 2 | 102 | BBB | 25 |
| 3 | 103 | CCC | 43 |

TABLE A-continued

| ROWID | ID | NAME | AGE |
|---|---|---|---|
| 4 | 104 | DDD | 12 |
| 5 | 105 | EEE | 50 |
| 6 | 106 | FFF | 60 |
| 7 | 107 | GGG | 27 |
| 8 | 108 | H10 | 11 |
| 9 | 109 | H20 | 6 |
| 10 | 110 | H30 | 34 |

There are ten tuples, records, or rows. Each row relates to a person who has an identification number 'ID', a name 'NAME' and an age 'AGE'.

The table is selected to undergo obsolescence control for a period of time and the following parameter values are specified with the following commands

```
SET obsolescence_control_period = 5 cycles; (N)
SET obsolescence_time_limit=2 cycles; (M)
SET obsolescence_cycle = 1 hour; (T)
SET obsolescence_update_phase =15 minutes; (ΔT)
SET obsolescence_mask = 000011; (since M=2)
SET current_obsolescence_cycle = 000001;
    (set least significant bit to 1 for initial setup & with length of N+1 bits)
```

A bitmap table or index for the obsolescence control process is then created to store the obsolescence bitmaps for each cycle as well as the obsolescence mask and the current obsolescence cycle. The bitmap table creation is prompted by the command:

ALTER TABLE TABLEA ENABLE OBSOLESCENCE;

The bitmap table TABLEB contains the metadata associated with TABLEA being subjected to an obsolescence control process. The bitmap table has N+1 columns with column zero being for initial setup, and is set up with the same number of rows as the table it is tracking, i.e. in this case ten. The bitmap table at initial setup is as follows:

TABLE B

| ROWID | OBSOLESCENCE BITMAP INDEX | | | | | |
|---|---|---|---|---|---|---|
|  | 5 | 4 | 3 | 2 | 1 | 0 |
| 1 | 0 | 0 | 0 | 0 | 0 | 1 |
| 2 | 0 | 0 | 0 | 0 | 0 | 1 |
| 3 | 0 | 0 | 0 | 0 | 0 | 1 |
| 4 | 0 | 0 | 0 | 0 | 0 | 1 |
| 5 | 0 | 0 | 0 | 0 | 0 | 1 |
| 6 | 0 | 0 | 0 | 0 | 0 | 1 |
| 7 | 0 | 0 | 0 | 0 | 0 | 1 |
| 8 | 0 | 0 | 0 | 0 | 0 | 1 |
| 9 | 0 | 0 | 0 | 0 | 0 | 1 |
| 10 | 0 | 0 | 0 | 0 | 0 | 1 |

That is, the obsolescence bitmap for cycle 0, is all '1's indicating that all rows are active, i.e. visible to search queries.

In the following, we now track the first three cycles of the obsolescence control process query by query, showing how the queries define which rows do not become obsolete and thus by inference those rows which do become obsolete.

FIGS. 5A to 5M each show the contents of Table A and the Bitmap Index at 13 different stages during these first three cycles.

The top row in each figure shows the command which has been issued, which apart from the first figure is a database query SELECT command. The first command is an ENABLE OBSOLESCENCE command.

The time is indicated near the top left corner, e.g. 'T0', 'T0+1 min' etc., using consistent labelling to that used in FIG. 3 and FIG. 4.

Rows which are returned following a SELECT command are highlighted in bold and with a thin-line box around them.

The text SHIFT indicates times when the 'current_obsolescence_cycle' bit pattern is left shifted.

Circled elements in the bitmap index shows rows that are now obsolete, with the circled element appearing in the obsolescence bitmap for the cycle in which they were last accessed.

FIG. 5A reproduces the two tables shown above in the main text, i.e. at the initial state at time T0.

FIG. 5B shows the status at time 'T0+1 minute' which is at the start of the first cycle and during the update phase thereof. The text SHIFT indicates the current_obsolescence_cycle bit pattern has been left shifted, which occurred when the initial setup was concluded and the first cycle commenced. In response to a query to find records of people aged 15 or over, rows 2, 3, 5, 6, 7 and 10 are returned. The bitmap for cycle 1 is updated to set the relevant bits to 1, with the corresponding bits for cycle 0 being set to 0.

FIG. 5C shows the status at time 'T0+3 minute' which is still during the update phase of the first cycle. The query is specific to a single record, namely the record of row 1. The bitmap for cycle 1 is updated to set the bit for row 1 to 1, with the row 1 bit for cycle 0 being set to 0.

FIG. 5D shows the status at time 'T0+13 minute' which is once again still during the update phase of the first cycle. The query returns the records of rows 8, 9 and 10. The bitmap for cycle 1 is updated to set the bits for rows 8, 9 and 10, with the corresponding bits for cycle 0 being set to 0. Here it is noted the changes are limited to rows 8 & 9, since row 10 was previously accessed earlier in the same update phase, i.e. with the first query.

FIG. 5E shows the status at time 'T0+16 minutes' which is still in the first cycle, but now after the end of the update phase. In response to a query to find all records, they are all returned, but no updates are made to the bitmap index, which will now be static for the remainder of the first cycle.

FIG. 5F shows the status at time 'T1' at the start of the second cycle. The text SHIFT indicates the 'current_obsolescence_cycle' bit pattern is left shifted so that the '1' is aligned with the second cycle's column in the bitmap index. This time is during the 15-minute update phase of the new cycle. The query returns rows 5 and 6. The bitmap for cycle 2 is updated to set the relevant bits to 1, with the corresponding bits for cycle 1 (when rows 5 & 6 were most recently accessed) being set to 0.

FIG. 5G shows the status at time 'T1+7 minutes' after the first query in the second cycle. This time is during the 15-minute update phase of the new cycle. The query returns rows 8, 9 and 10. The bitmap for cycle 2 is updated to set the relevant bits to 1, with the corresponding bits for cycle 1 (when these rows were most recently accessed) being set to 0. It is noted that, should the query have also returned row 4, then the row 4 bit of the bitmap for cycle 2 would have been set to 1 and the row 4 bit of the bitmap for cycle 0 would have been set to 0. This is because, at this time, cycle 0 would still have been within the obsolescence time limit for cycle 2 queries.

FIG. 5H shows the status at time 'T1+12 minutes' where a further query during the update phase returns row 1.

FIG. 5I shows the status at time 'T1+20 minutes' which is still in the second cycle, but now after the end of the update phase. At this point, two update phases have been completed, so records which have last been accessed in cycle 0 (this means never accessed since obsolescence was enabled for Table A) are now marked as obsolete. In this example, the only such record is row 4. At the end of the update phase of cycle 2, the bitmap for cycle 0 becomes frozen, and its row 4 bit has a value of 1 indicating row 4 is now obsolete. That is because the obsolescence bitmap for cycle 0 will no longer be accessed by any queries, since cycle 0 lies outside the obsolescence time limit. Because of this, the response to the query to find records with age of 12+ does not include the obsolete record of row 4, which it otherwise would have had obsolescence not been enabled for Table A.

FIG. 5J emphasizes the same point by showing a query to return the whole of Table A. Row 4 is missing again owing to its obsolescence.

FIG. 5K shows the status at time 'T2' at the start of the second cycle and simultaneous with a query. The text SHIFT indicates the 'current_obsolescence_cycle' is left shifted so that the '1' is aligned with the third cycle's column in the bitmap index. This time is during the 15-minute update phase of the new cycle. The query returns rows 1, 5, 6, 8 and 9 (but not obsolete row 4). The bitmap for cycle 3 is updated to set the relevant bits to 1, with the corresponding bits for cycle 2 (when these rows were most recently accessed) being set to 0.

FIG. 5L shows another query during the update phase of cycle 3, at 'T2+2 minutes' where similar measures are taken to before in order to update the bitmap index.

FIG. 5M is at time 'T2+16 minutes' so now after the end of the update phase of cycle 3. At this point, three update phases have been completed, so records which have last been accessed in cycle 1 are now marked as obsolete. In this example, these are rows 2, 3 and 7. At the end of the update phase of cycle 3, the bitmap for cycle 1 becomes frozen, and its row 2, 3 and 7 bits have a value of 1 indicating these rows are now obsolete. Referring now to the query, it is to return the whole table, but of course it does not return row 4, which was last accessed in cycle 0, or the newly obsolete rows 2, 3 and 7, where were last accessed in cycle 1.

The further progress of the bitmap index in subsequent cycles will now be readily understood, so we conclude this worked example at this point.

In summary, in a relational database of tables, data obsolescence is managed using a bitmap (or bit array) index which is associated with a table during an obsolescence control period. A table is selected to undergo obsolescence control for a period of time defined by a number cycles. Any records that have not been accessed for a certain number of cycles, which represents an obsolescence limit, are deemed to be obsolete. During at least a part of each cycle, the results of database queries to the table are monitored, such that for each cycle an 'obsolescence' bitmap is created indicating which records were accessed. Once a sufficient number of obsolescence bitmaps are available, so that records that have not been accessed at all since the start of the obsolescence control period lie outside the obsolescence limit, queries are restricted to records which have been accessed during the last few cycles by applying the most recently stored obsolescence bitmaps.

The above-described data obsolescence management involves the creation of a dis-associated bitmap index to determine which specific record is relevant or not relevant (and hence obsolete). The relevancy of the record is controlled by a set of parameters that will determine how often the record is accessed over an applicable time window, along with additional metadata for each table to track the current obsolescence status. In accordance with those parameters, the bitmap index can be updated or not with the records that fall within the conditions specified by those parameters. As users start to query the table, the bitmap index is added to provide a filtering condition on which a positive match will return the record, and a negative match (or the absence of a match) will not return the record. The additional filtering condition provided by the obsolescence control process can be added by the database engine transparently and without the user needing to perform any additional actions.

It will also be understood that the obsolescence management can also be performed on groups of tables in the same way that is described above in the specific examples for a single table. References to a table throughout this document can therefore also be construed as meaning a group of tables.

Generally, it will be advantageous, although not essential, to limit the update phase of each cycle to a portion of the overall cycle, rather than allowing updates to take place throughout each cycle. Firstly, updating consumes resource, so avoiding it for some of each cycle saves resource. Secondly, and perhaps more significantly, it is beneficial to choose the update phase to coincide with periods of time when it is expected or known that many queries will be executed. A typical example would be at the end of normal office hours, e.g. from 8 pm to midnight when a cycle is 24 hours. This will result in an accurate and representative cross-section of the records being marked as obsolete, so that in this example queries that take place during the next working day (which is in the same cycle) will benefit from the obsolescence definitions gained in the period 8 pm to midnight the previous evening. It will also be understood that the update phase can be at any time within a cycle, and need not necessarily start at the beginning of the cycle as in the specific examples described above.

It will also be understood that the flowcharts, block diagrams and tables shown in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and/or tables, and combinations of blocks in the block diagrams and/or flowchart illustration and/or tables, can be implemented by special purpose hardware-based systems that perform the specified functions or acts or carry out combinations of special purpose hardware and computer instructions. Finally, it will be understood that features of the subordinate claims may be freely combined in all permutations with those of other subordinate claims to the extent that the respective features of the relevant subordinate claims are not presented as alternatives in this disclosure.

What is claimed is:
1. A computer system comprising:
one or more computer processors;
one or more computer readable storage media and program instructions stored on the one or more computer readable storage media, the program instructions comprising instructions to perform:

selecting a table to undergo obsolescence control for a period of time, wherein the selection involves specifying: a total number of cycles for which obsolescence control will take place, which is at least three; a duration of each cycle; and a time limit 'M' specified in terms of a number of cycles, which is at least two but less than the total number of cycles;

storing a bitmap cycle counter associated with the table, and a bit mask associated with the table, in a metadata database store;

monitoring results of database queries to that table during a first cycle, wherein records that are accessed by a database query are tagged;

storing an obsolescence bitmap of records accessed during the first cycle;

monitoring results of database queries to that table during a next cycle, wherein records that are accessed by a database query are tagged;

storing a further obsolescence bitmap of records accessed during the next cycle; and repeating the monitoring and storing steps for subsequent cycles so that an obsolescence bitmap is stored for each cycle, wherein: (i) once 'M' obsolescence bitmaps are available, queries are restricted to records which have been accessed during the last 'M' cycles by applying the 'M' most recently stored obsolescence bitmaps, (ii) the bitmap cycle counter counts which obsolescence cycle is current for the table, and (iii) the bit mask validates obsolescence records according to the binary values of the obsolescence bitmap.

2. The system of claim 1, wherein selecting a table to undergo obsolescence control further involves specifying an update phase during each cycle, which will generally be shorter than the cycle duration, and wherein the monitoring of the results of database queries during the first cycle and subsequent cycles is restricted to the update phase of each cycle, so that the obsolescence bitmap of each cycle relates only to records accessed during the update phase of that cycle.

3. The system of claim 1, wherein, at the end of the obsolescence control period, the obsolescence control for the table is de-selected allowing subsequent queries to access all records of the table.

4. The system of claim 1, wherein, at the end of the obsolescence control period, the obsolescence control for the table is continued with by rotating the 'M' most recently stored obsolescence bitmaps to where they would have been had they been generated in the first 'M' cycles, so that subsequent queries continue to be restricted to records which have been accessed during the last 'M' cycles.

5. The system of claim 1, wherein, during the obsolescence control period, records which can no longer be accessed by queries are moved to higher latency storage.

6. The system of claim 1, wherein, during the obsolescence control period, records which can no longer be accessed by queries and are hence obsolete are moved into a different table, to create an obsolete table distinct from the selected table which will now only contain records which are still accessible as identified by the most recently stored 'M' obsolescence bitmaps, and, on conclusion of the obsolescence control period, the obsolete table is merged back into the selected table.

7. The system of claim 1, wherein, when storing an obsolescence bitmap for a current cycle 'n', the bitmaps of the 'n−1'th to 'n−M'th cycles are refreshed to untag records that were accessed in those previous cycles but have also been accessed in the current cycle, so that bitmaps of the 'n−1'th to 'n−M'th cycles only tag records that have not been accessed in the current cycle, but were accessed in that previous cycle.

8. The system of claim 1, wherein the obsolescence bitmaps are dis-associated from the tables with which they are associated in such a way that modifications to contents of a table during a period when obsolescence control is being applied do not cause modification of its obsolescence bitmaps.

9. A computer program product comprising:

one or more computer readable storage media and program instructions stored on the one or more computer readable storage media, the program instructions comprising instructions to perform:

selecting a table to undergo obsolescence control for a period of time, wherein the selection involves specifying: a total number of cycles for which obsolescence control will take place, which is at least three; a duration of each cycle; and a time limit 'M' specified in terms of a number of cycles, which is at least two but less than the total number of cycles;

storing a bitmap cycle counter associated with the table, and a bit mask associated with the table, in a metadata database store;

monitoring results of database queries to that table during a first cycle, wherein records that are accessed by a database query are tagged;

storing an obsolescence bitmap of records accessed during the first cycle;

monitoring results of database queries to that table during a next cycle, wherein records that are accessed by a database query are tagged;

storing a further obsolescence bitmap of records accessed during the next cycle; and repeating the monitoring and storing steps for subsequent cycles so that an obsolescence bitmap is stored for each cycle, wherein: (i) once 'M' obsolescence bitmaps are available, queries are restricted to records which have been accessed during the last 'M' cycles by applying the 'M' most recently stored obsolescence bitmaps, (ii) the bitmap cycle counter counts which obsolescence cycle is current for the table, and (iii) the bit mask validates obsolescence records according to the binary values of the obsolescence bitmap.

10. The computer program product of claim 9, wherein selecting a table to undergo obsolescence control further involves specifying an update phase during each cycle, which will generally be shorter than the cycle duration, and wherein the monitoring of the results of database queries during the first cycle and subsequent cycles is restricted to the update phase of each cycle, so that the obsolescence bitmap of each cycle relates only to records accessed during the update phase of that cycle.

11. The computer program product of claim 9, wherein, at the end of the obsolescence control period, the obsolescence control for the table is de-selected allowing subsequent queries to access all records of the table.

12. The computer program product of claim 9, wherein, at the end of the obsolescence control period, the obsolescence control for the table is continued with by rotating the 'M' most recently stored obsolescence bitmaps to where they would have been had they been generated in the first 'M' cycles, so that subsequent queries continue to be restricted to records which have been accessed during the last 'M' cycles.

\* \* \* \* \*